April 12, 1966 S. K. HAMBLING ETAL 3,245,500
SPOT TYPE DISC BRAKES
Filed Jan. 24, 1964 7 Sheets-Sheet 7
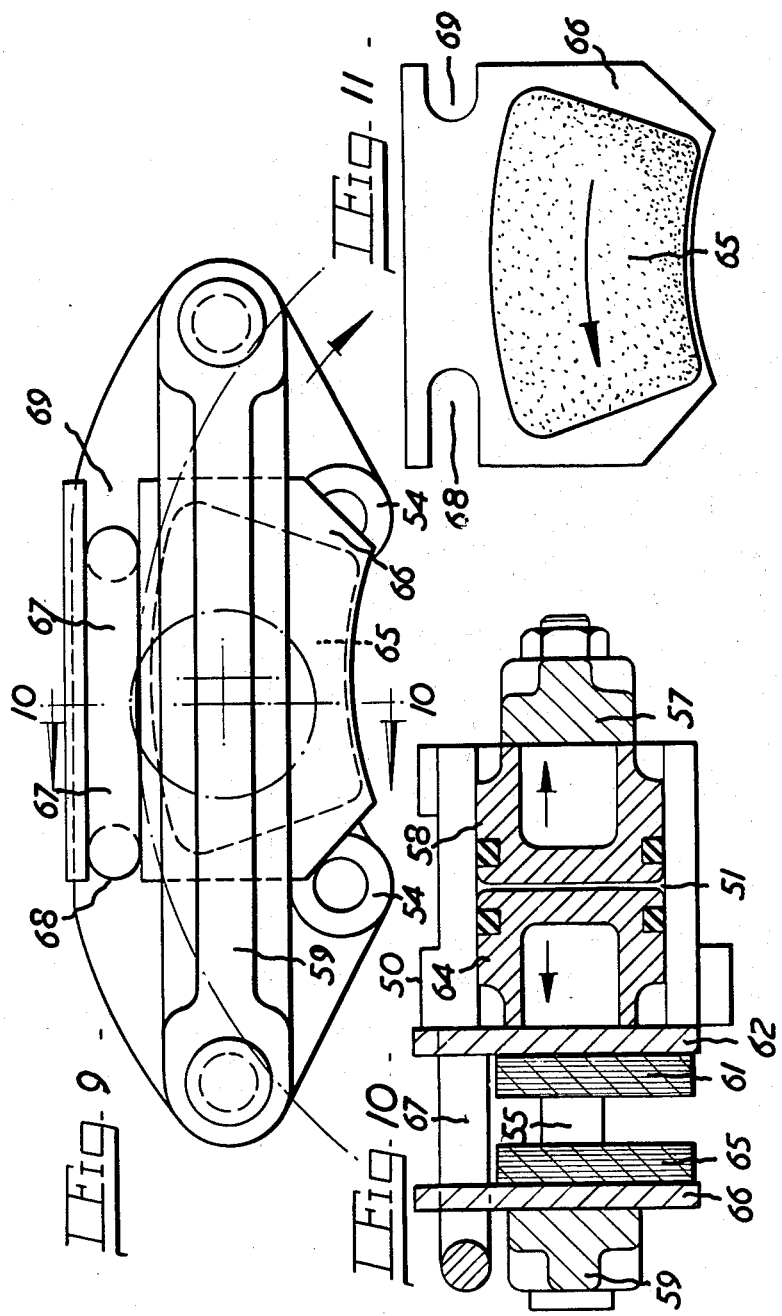
Stewart Kevern Hambling + Geoffrey Frederick Brown
BY Scrivener, Parker, Scrivener + Clarke – # United States Patent Office 3,245,500
Patented Apr. 12, 1966

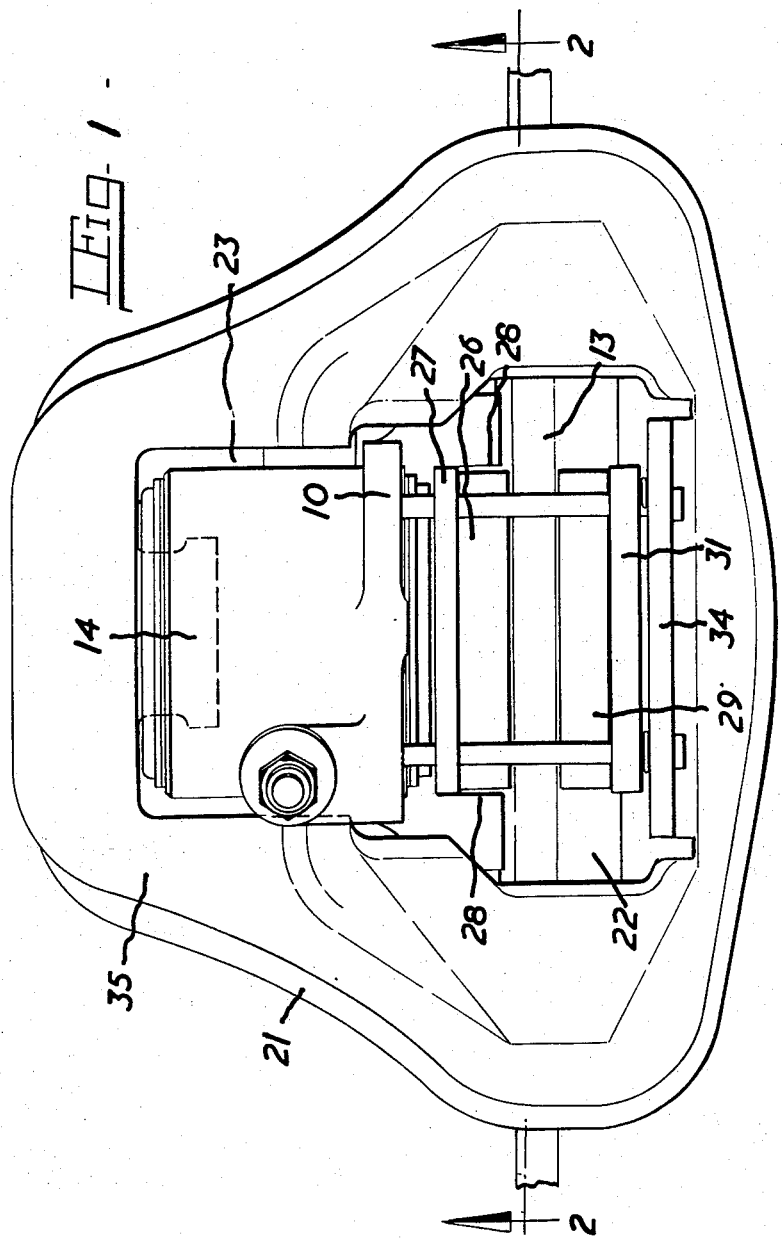

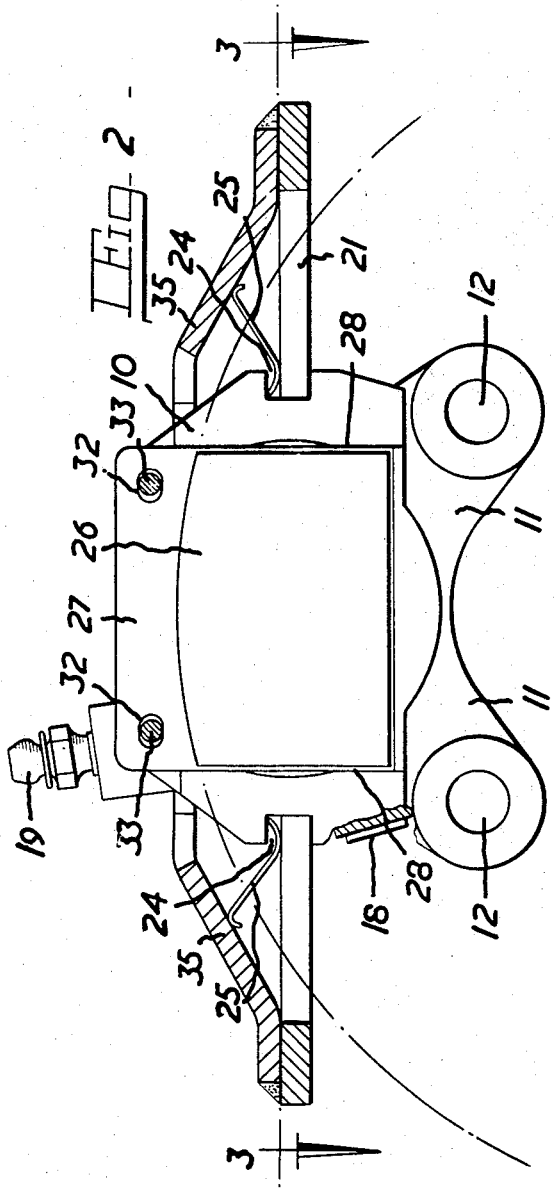

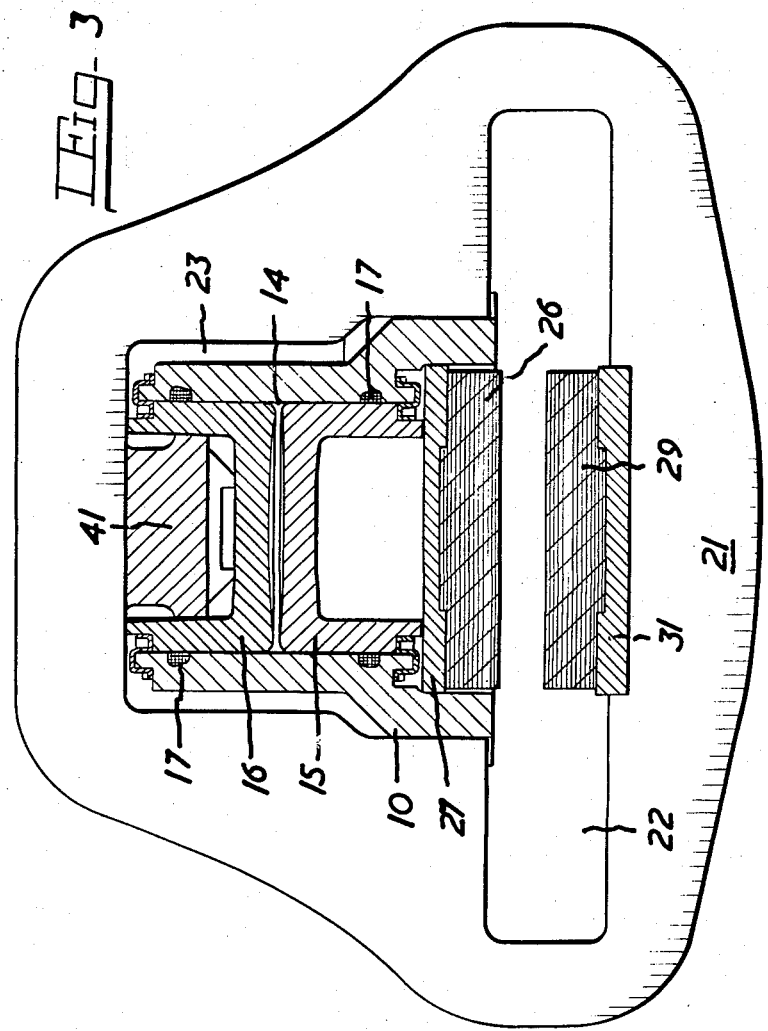

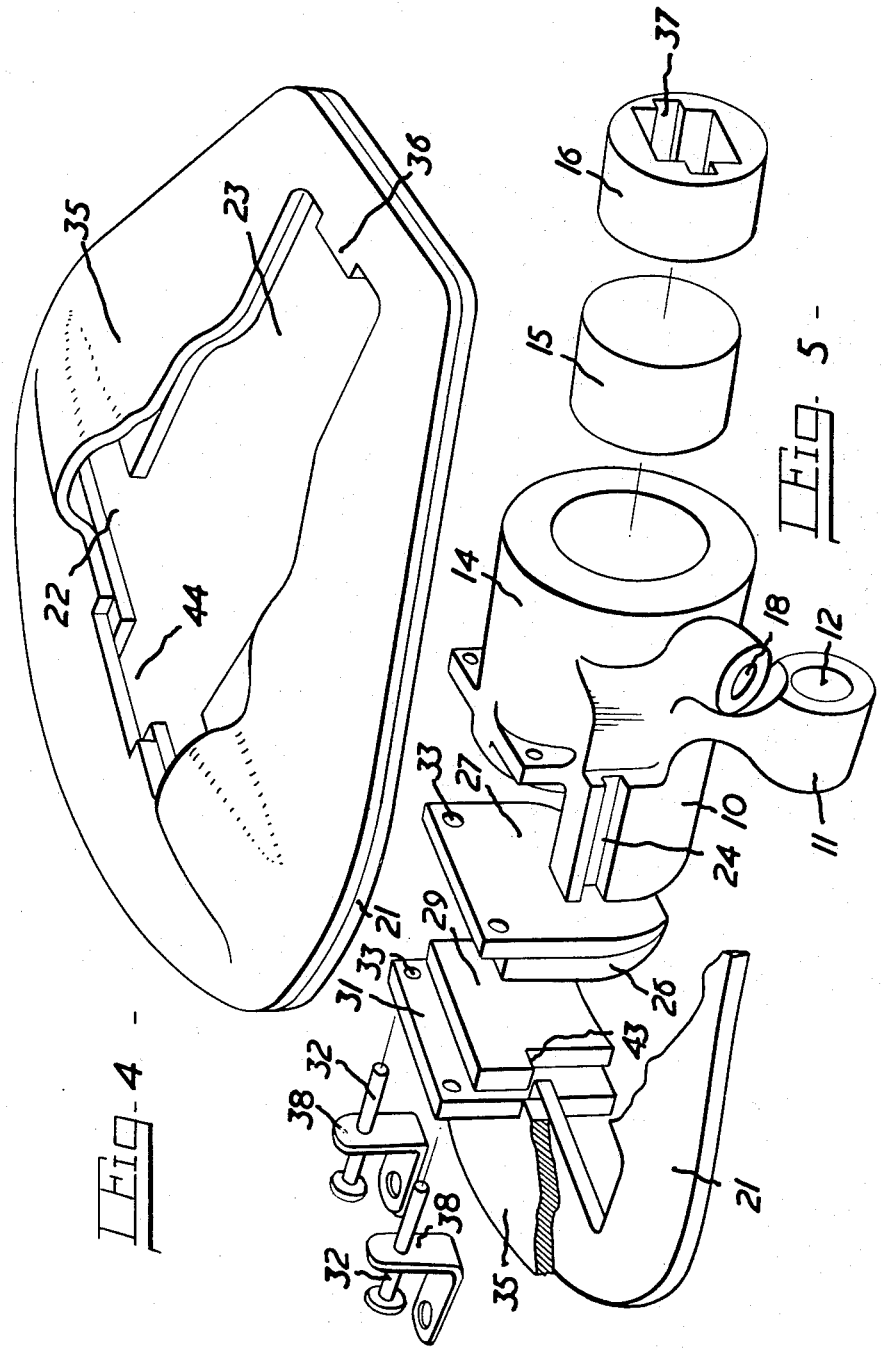

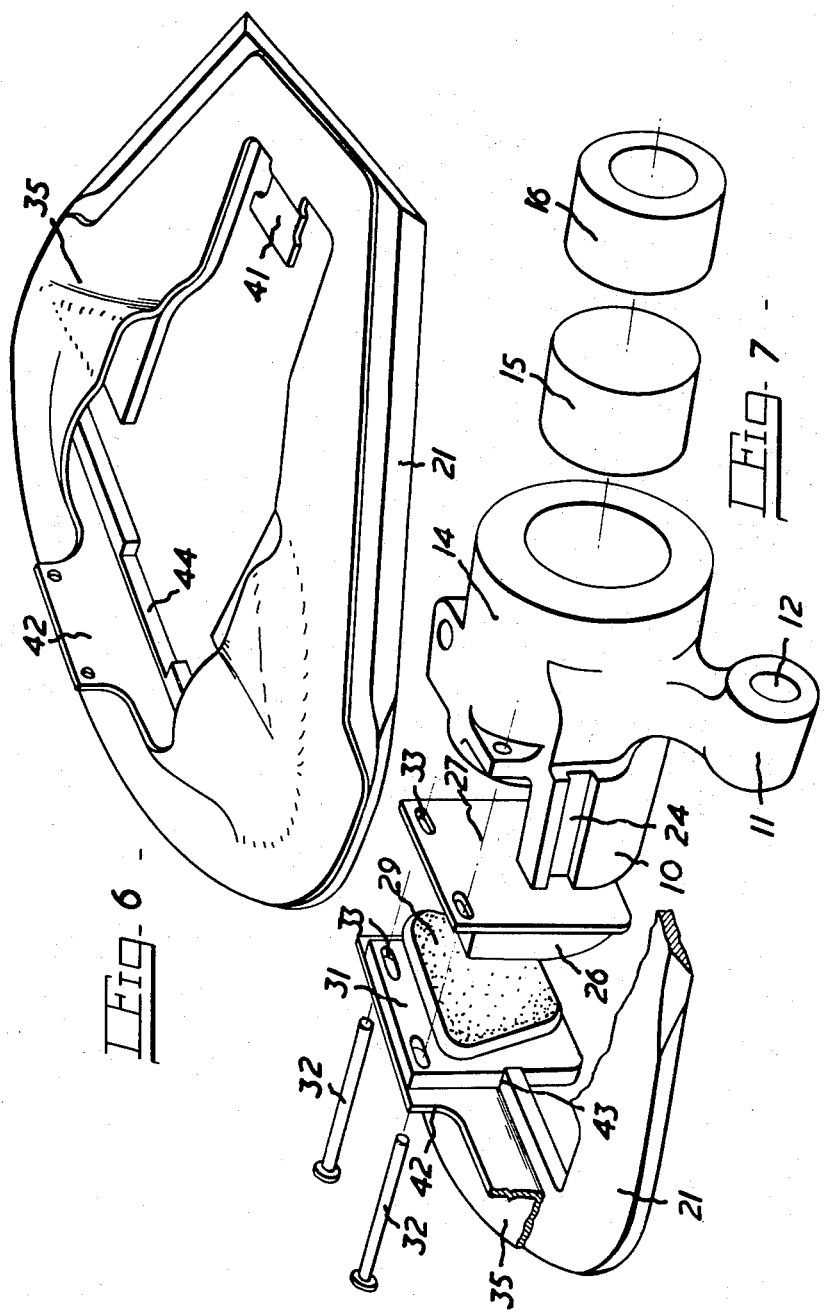

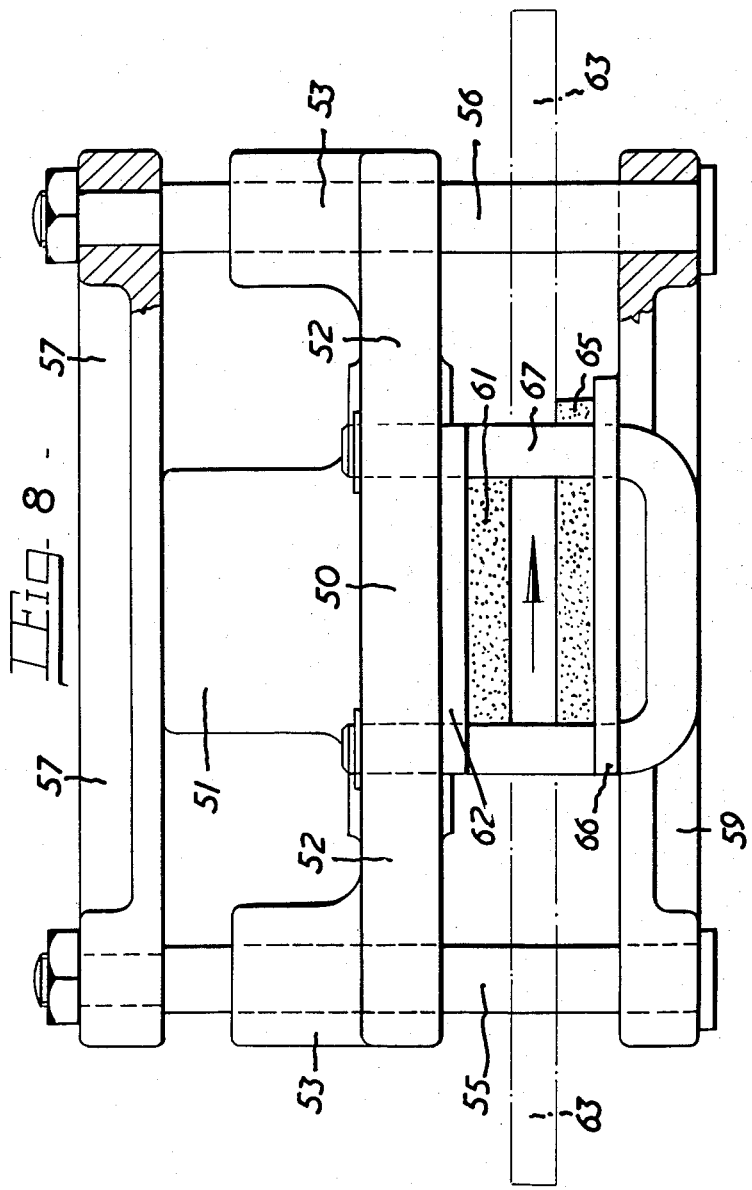

3,245,500
SPOT TYPE DISC BRAKES
Stewart Kevern Hambling, Tamworth, Staffs, and Geoffrey Frederick Brown, Solihull, England, assignors to Girling Limited, Birmingham, England, a British company
Filed Jan. 24, 1964, Ser. No. 339,939
Claims priority, application Great Britain, Feb. 12, 1963, 5,599/63; Sept. 6, 1963, 35,244/63
19 Claims. (Cl. 188—73)

This invention relates to improvements in disc brakes of the kind in which friction pads are adapted to be brought into engagement with opposite faces of a rotatable disc by hydraulic actuating means.

In a disc brake according to our invention, an hydraulic cylinder in which opposed pistons work is located in a stationary member mounted on a fixed part adjacent to one side of the disc, and one piston acts directly on a friction pad located between the piston and the disc, while the other piston acts in the opposite direction on a plate or yoke which straddles the periphery of the disc and is adapted to urge a second friction pad into engagement with the opposite face of the disc.

The plate or yoke is conveniently a flat plate member lying in a plane at right angles to a radius of the disc passing through the axis of the hydraulic cylinder and having an opening of such outline and dimensions as to fit over the stationary member and to permit the insertion and removal of the friction pad assemblies through the opening, the plate or yoke being slidably mounted on the stationary member for movement in a direction parallel to the axis of the disc.

Two forms of brake in accordance with our invention and some modifications are illustrated by way of example in the accompanying drawings in which:

FIGURE 1 is a plan of one form of brake;
FIGURE 2 is a section on the line 2—2 of FIGURE 1;
FIGURE 3 is a section on the line 3—3 of FIGURE 2;
FIGURE 4 is a perspective view of the stationary member of the brake by itself;
FIGURE 5 is a perspective view of the other parts of the assembly shown separated;
FIGURES 6 and 7 are perspective views similar to FIGURES 4 and 5 but showing some modifications;
FIGURE 8 is a plan of another form of brake;
FIGURE 9 is an end view;
FIGURE 10 is a section on the line 10—10 of FIGURE 9; and
FIGURE 11 is a front elevation of the indirectly actuated friction pad assembly.

In the brake illustrated in FIGURES 1 to 3 the stationary member 10 of the brake is a casting having two spaced lugs 11 which extend radially inwards from it and are provided with openings 12 adapted to receive bolts by which the member is secured to a stationary part adjacent to one side of the brake disc 13. The member 10 incorporates an hydraulic cylinder 14 which is open at both ends and of which the axis is substantially parallel to the axis of the disc. Working in the cylinder are two opposed pistons 15, 16, each of which is sealed by a sealing ring 17 housed in an annular groove in the cylinder bore. For urging the pistons apart, fluid under pressure from a master cylinder or other source of pressure fluid is supplied to the space in the cylinder between the pistons through a connection 18. A nipple 19 for bleeding the cylinder is also provided.

Fitting over the member 10 and over the adjacent part of the periphery of the disc is a yoke 21. The essential part of the yoke is a flat plate which is blanked out of steel plate of the maximum thickness consistent with the ability to remove by precision blanking a central portion of the plate of the outline shown more particularly in FIGURE 1. By this method the plate can be blanked out in a single operation to a sufficiently high degree of accuracy not to require any subsequent machining. The opening in the plate provides a slot 22 extending lengthwise at right angles to the axis of the cylinder and of a length and width such as to accommodate an arcuate portion of the periphery of the disc to which the plate is chordal. The opening also includes a portion 23 having spaced side edges which are parallel to the axis of the disc and are received in opposed grooves 24 in the sides of the member 10 for slidably guiding the yoke in a direction parallel to the axis of the disc. The radial depth of the grooves is substantially greater than the thickness of the yoke as shown in FIGURE 2 and the yoke is resiliently held in sliding engagement with the radially innermost faces of the grooves by blade springs 25. This avoids any risk of the movement of the yoke being impeded by corrosion or dirt.

A friction pad 26 bonded or otherwise secured to a rigid backing plate 27 is interposed between the cylinder 14 and the adjacent face of the disc, the side edges of the backing plate being in sliding engagement with parallel guiding surfaces 28 on the member 10 which guide the pad assembly for sliding movement towards and away from the disc and transmit the torque to the member 10 when the brake is applied. When fluid under pressure is supplied to the cylinder the friction pad 26 is applied to the adjacent face of the disc by the direct engagement of the piston 15 with the backing plate 27. At the same time the piston 16 is moved in the opposite direction and acting on the yoke moves the yoke in a direction to apply to the opposite face of the disc a second friction pad 29 carried by a backing plate 31 located in a recess in the edge of the slot 22 remote from the cylinder. The torque on the friction pad 29 is taken by the yoke which transfers it to the stationary member 10.

As the yoke is free to move axially the forces applied to the two friction pads are balanced.

The friction pad assemblies are retained against radial movement by parallel pins 32 passing through slots 33 in outward extensions of the backing plates. The pins are fixed at their inner ends in the tsationary member 10 and at their outer ends are slidable through a projecting lug 34 on the yoke.

For passenger cars and vehicles of similar weight a yoke formed by a single plate will normally be sufficient to carry the load involved. However the thickness of the plate is limited if it is to be produced by a precision blanking operation and for heavier vehicles it is desirable to reinforce the plate. In the arrangement shown in FIGURES 1 to 3 the plate is reinforced by a steel pressing 35 of roughly the same outline as the plate. The pressing, which is of lighter gauge metal than the plate 21, is welded to the plate around its periphery but is raised over its central part and particularly adjacent to the slot to follow the contour of the edge of the disc.

The backing plate 27 of the friction pad 26 is engaged by the end of the piston 15 which distributes the load over a substantial area of the backing plate. The backing plate 31 of the friction pad 29 however is only engaged over a relatively small central area by the yoke 21, this area being equal to the thickness of the base plate multiplied by the length of the backing plate, and it is therefore desirable to make the backing plate 31 of substantial thickness to avoid deformation of the backing plate under load.

Where a reinforced yoke as shown in FIGURES 1 to 3 is employed an economy in material can be effected by forming the backing plate 27 from the metal pierced out of the reinforcing pressing 35 and the backing plate 31 from the heavier gauge metal pierced out of the plate 21.

It will be appreciated that the two friction pads and backing plates need not be of the same dimensions or outline.

It will also be appreciated that both the yoke and the directly actuated friction pad are slidably guided on spaced arms which extend forwardly from the stationary member towards the disc.

The ends of the backing plate 27 of the directly actuated friction pad 26 are in sliding engagement with flat parallel surfaces on the inner sides of the arms and the yoke is slidably engaged in the parallel grooves 24 in the outer sides of the arms.

FIGURES 4 and 5 show the yoke formed with a rectangular tongue 36 which is received in a slot 37 in the outer end of the piston 16 and assists in locating the yoke with respect to the member 10 against the turning moment applied to the yoke by the indirectly actuated pad 29. They also show the retaining pins 32 for the friction pad assemblies slidably mounted at their outer ends in cranked lugs 38 adapted to be bolted to the yoke.

In the modification shown in FIGURES 6 and 7 the reinforcing pressing portion 35 of the yoke is formed with a T-shaped tongue 41 which is received in the hollow outer end of the piston 16 to assist in resisting any turning moment on the yoke assembly when the brake is applied.

The tongue 41 is shown in engagement with the piston in FIGURE 3. An upstanding lug 42 is formed from the pressing at the other end of the opening to carry the outer ends of the locating pins 32 for the pad assemblies.

The holes 33 in the pad assemblies through which the locating pins pass may be accurately positioned holes as shown in FIGURE 5 instead of slots as shown in FIGURE 7 if it is desired that the pins should take part of the torque on the pad assemblies where the brake is applied.

FIGURES 5 and 7 also show the backing plate 31 of the indirectly actuated pad 29 reduced in width over its lower portion to provide shoulders 43. The lower part of the backing plate is received in a rectangular recess 44 in the yoke plate and the shoulders 43 engage the plate at each end of the recess to locate the pad assembly against radial movement inwardly and relieve the locating pins of a certain amount of stress.

In the brake shown in FIGURES 8 to 11 the stationary member 50 incorporates a double-ended cylinder 51 and lateral extensions 52 terminating in spaced bosses 53. Downward extensions 54 are drilled to receive bolts by which the member is secured to a stationary part at one side of the brake disc. Parallel draw-bars 55, 56 are slidably guided in bores in the bosses 53. The draw-bars are mounted at one end in a rigid beam 57 adapted to be engaged by a piston 58 working in the cylinder 51 and at the other end in a similar beam 59. The beams and draw-bar form a rigid frame or yoke which extends across the plane of the brake disc and is slidable relative to the stationary member 50 in a direction parallel to the axis of the brake disc. The beams are preferably of the T section shown more particularly in FIGURE 10.

A friction pad assembly comprising a friction pad 61 mounted on a backing plate 62 is located between the member 50 and the adjacent face of the brake disc 63 against which the pad is adapted to be urged by a second piston 64 working in the cylinder. A second friction pad assembly comprising a friction pad 65 mounted on a backing plate 66 is located between the opposite face of the disc and the beam 59. The friction pad assemblies are slidably mounted on the spaced parallel limbs of a U-shaped member 67 which is formed from steel rod and of which the ends are secured in the member 50. The limbs of the member 67 are received in slots 68, 69 in upward extensions of the backing plates of the friction pads, and the member 67 serves both to guide the friction pad assemblies and to transmit to the member 50 the torque on the friction pads when the brake is applied.

When fluid under pressure is supplied to the cylinder the two pistons are urged apart and the piston 64 applies the friction pad 61 directly to the adjacent face of the disc while the piston 58 moves the yoke in the opposite direction to apply the friction pad 65 to the opposite face of the disc, the forces applied to the two pads being balanced.

The torque on the friction pads applies a twisting force to the yoke and to counteract this force the centre of pressure of the indirectly actuated pad is preferably offset circumferentially to one side of the axis of the hydraulic cylinder in a direction opposed to the normal direction of rotation of the disc as shown more particularly in FIGURE 9 where X is the axis of the cylinder and Y is the centre of pressure of the friction pad. This effect can be obtained very simply by offsetting the slots 68, 69 in the backing plate of the friction pad relative to the pad as shown in FIGURE 11. In a modification the centres of pressure of both friction pads may be offset in opposite directions relative to the axis of the hydraulic cylinder.

In the embodiments described above the stationary member 10 or 50 incorporates a single double-ended hydraulic cylinder. In a modification the stationary member may incorporate two double-ended hydraulic cylinders located side-by-side with their axes parallel. Alternatively it may incorporate a single cylinder bore at one end and two parallel bores of smaller diameter at the other end, the bores being interconnected and the cross-sectional area of the two smaller bores being equal to the area of the large bore.

We claim:

1. A disc brake comprising a rotatable disc, a stationary member mounted on a fixed part and located on one side only of the disc, a double-ended hydraulic cylinder incorporated in the stationary member with its axis parallel to that of the disc, a substantially rigid yoke mounted on the stationary member and fitting over an adjacent portion of the periphery of the disc, co-operating guide means on said yoke and statonary member and wholly on one side of the disc for guiding the yoke for movement in a direction parallel to the axis of the disc, a first-friction pad located between the stationary member and the adjacent face of the disc, second co-operating guiding means on said friction pad and the stationary member, all of said second guiding means being entirely independent of and laterally spaced from said first mentioned guiding means but on the same side of the disc thereas for guiding the friction pad towards and away from the disc and for taking all of the drag on the friction pad when the brake is applied, a first piston working at one end of said hydraulic cylinder and adapted to bear on the first friction pad to urge it into engagement with the disc, a second friction pad located on the opposite side of the disc from the first pad, an engagement between said second friction pad and the yoke, and a second piston working at the other end of the hydraulic cylinder and adapted to bear on the yoke to move it in a direction opposite to that in which the first friction pad is moved and to bring the second friction pad into engagement with the disc.

2. A disc brake as in claim 1 wherein said second friction pad is carried by a backing plate located in the yoke.

3. A disc brake as in claim 1 wherein said first and second friction pads are both guided on parallel members which are carried by the stationary member and which take the drag on both friction pads when the brake is applied.

4. A disc brake as in claim 1 in which said stationary member carries spaced rigid arms extending towards the disc, the guiding means for the yoke are formed by parallel grooves in the outer sides of said arms, and the guiding and drag-taking means for the first friction pad are formed by parallel surfaces on the inner sides of said arms.

5. A disc brake as in claim 1 wherein said stationary member carries spaced rigid arms extending towards the disc and providing separate guiding surfaces for said first friction pad and for said yoke, one of said arms taking the drag on said first friction pad when the brake is applied and the other of said arms taking the drag on the second friction pad through the yoke.

6. A disc brake as in claim 1 wherein said first co-operating guiding means comprises groove means on said stationary member, and parts on said yoke slidably received in said groove means.

7. A disc brake as in claim 6 wherein said groove means includes opposed faces spaced apart a greater distance than the width of the parts of said yoke received therein, and resilient means urging said parts against one of said faces.

8. A disc brake as in claim 1 wherein said yoke comprises a flat steel plate having an opening of such dimensions and outline as to receive the stationary member and a portion of the periphery of the disc to which the plate is chordal when in position.

9. A disc brake as in claim 1 wherein said yoke comprises a flat steel plate having one opening of such dimensions and outline as to receive the stationary member and a portion of the periphery of the disc, and a part of said opening has spaced parallel side edges which are slidably received in opposed grooves in the stationary member, said grooves being of a radial depth greater than the thickness of the plate, and resilient means being provided for holding said plate in sliding engagement with the radially innermost walls of the grooves.

10. A disc brake as in claim 1 wherein said yoke comprises a flat steel plate reinforced by a steel pressing welded to the plate.

11. A disc brake as in claim 1 wherein said yoke comprises a flat steel plate reinforced by a steel pressing welded to the plate, said pressing being raised over its central portion to a contour conforming substantially to that of the periphery of the disc.

12. A disc brake as in claim 1 wherein said friction pads are carried by rigid metal backing plates with which said first piston and said yoke respectively engage and the backing plate of the second friction pad is of heavier gauge metal than the backing plate of the first friction pad.

13. A disc brake as in claim 1 wherein said first friction pad is carried by a rigid backing plate which is slidably guided between spaced parallel surfaces on said stationary member for movement towards and away from the disc.

14. A disc brake as in claim 1 wherein said second friction pad is carried by a rigid backing plate which is engaged by an edge of an opening in the yoke.

15. A disc brake as in claim 1 wherein said friction pads are carried by rigid backing plates and are located against radial movement by parallel pins with which said backing plates are in sliding engagement, said pins being fixed at one end in the stationary member and being slidably mounted at the other end in a part carried by the yoke.

16. A disc brake as in claim 1 wherein said yoke is formed with a projection entering a recess in the outer end of said second piston.

17. A disc brake as in claim 1 wherein the centre of pressure of at least one of said friction pads is offset circumferentially with respect to the axis of the hydraulic cylinder.

18. A disc brake as in claim 1 wherein said stationary member carries spaced arms extending towards the disc and said first friction pad and said yoke are both slidably guided on the arms.

19. A disc brake as in claim 18 wherein said first friction pad is carried by a rigid backing plate and said arms have on their inner sides parallel surfaces with which the ends of said backing plate slidably engage and in their outer sides parallel grooves in which the yoke is guided.

References Cited by the Examiner

UNITED STATES PATENTS

| 2,784,811 | 3/1957 | Butler | 188—73 |
| 2,820,530 | 1/1958 | Chouings et al. | 188—73 |
| 2,949,173 | 8/1960 | Peras | 188—73 X |
| 2,963,116 | 12/1960 | Peras | 188—73 |
| 3,065,829 | 11/1962 | Bessler et al. | 188—73 |
| 3,158,230 | 11/1964 | Chouings | 188—73 |

FOREIGN PATENTS

| 612,669 | 1/1961 | Canada. |
| 905,797 | 9/1962 | Great Britain. |
| 1,270,684 | 7/1961 | France. |

MILTON BUCHLER, *Primary Examiner.*

EUGENE G. BOTZ, ARTHUR L. LA POINT,
*Examiners.*

G. HALVOSA, *Assistant Examiner.*